United States Patent
Dowlatkhah et al.

(10) Patent No.: US 10,966,072 B2
(45) Date of Patent: Mar. 30, 2021

(54) SMART CASCADING SECURITY FUNCTIONS FOR 6G OR OTHER NEXT GENERATION NETWORK

(71) Applicants: AT&T Mobility II LLC, Atlanta, GA (US); AT&T Intellectual Property I, L.P., Atlanta, GA (US)

(72) Inventors: Sangar Dowlatkhah, Plano, TX (US); Zhi Cui, Sugar Hill, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 16/376,600

(22) Filed: Apr. 5, 2019

(65) Prior Publication Data

US 2020/0322765 A1 Oct. 8, 2020

(51) Int. Cl.
*H04W 4/50* (2018.01)
*H04W 40/30* (2009.01)
(Continued)

(52) U.S. Cl.
CPC ............ *H04W 4/50* (2018.02); *H04L 67/10* (2013.01); *H04L 69/22* (2013.01); *H04W 4/24* (2013.01);
(Continued)

(58) Field of Classification Search
CPC ......... H04L 67/10; H04L 67/02; H04L 67/16; H04L 63/20; H04L 67/34; H04L 41/0893;
(Continued)

(56) References Cited

U.S. PATENT DOCUMENTS 7,212,829 B1 5/2007 Lau et al.
7,743,984 B2 6/2010 Olsen et al.
(Continued)

FOREIGN PATENT DOCUMENTS

CA 2695533 C 11/2017
KR 20080001235 A 1/2008
(Continued)

OTHER PUBLICATIONS

Albretsen, et al. "Context-Aware Goods: Combining RFID Tracking and Environment Sensing." Norwegian University of Science and Technology, Department of Computer and Information Science, MS thesis. 2008. 180 pages. https://brage.bibsys.no/xmlui/ bitstream/handle/11250/251280/348646_FULLTEXT01.pdf?sequence=2.
(Continued)

*Primary Examiner* — Luat Phung
*Assistant Examiner* — Najeeb Ansari
(74) *Attorney, Agent, or Firm* — Amin, Turocy & Watson, LLP

(57) ABSTRACT

In a 6G network, microservices can be utilized in the absence of a core network. For example, after a mobile device has authenticated, through its carrier network, with a transport service layer, microservices can be allocated to the mobile device without having to be transmitted via the core network. Thus, removing the core network from the process can generate a direct line of microservices from the transport layer to the end-user. Furthermore, additional microservices and/or resources can be access through a microservices library. Consequently, packets can be securely transmitted be a wireless network facilitating sending packet profile data from one to many node devices in anticipation of the packet traversing the various node devices.

20 Claims, 10 Drawing Sheets

(51) Int. Cl.
*H04W 76/10* (2018.01)
*H04W 12/08* (2021.01)
*H04L 29/06* (2006.01)
*H04W 40/12* (2009.01)
*H04W 40/34* (2009.01)
*H04W 4/24* (2018.01)
*H04L 29/08* (2006.01)

(52) U.S. Cl.
CPC ............ *H04W 12/08* (2013.01); *H04W 40/12* (2013.01); *H04W 40/30* (2013.01); *H04W 40/34* (2013.01); *H04W 76/10* (2018.02)

(58) Field of Classification Search
CPC ..... H04L 67/141; H04L 67/32; H04L 67/327; H04L 41/5025; H04L 43/08; H04L 41/0896; H04L 41/12; H04W 4/50; H04W 12/08; H04W 24/02; H04W 48/18; H04W 84/18
See application file for complete search history.

(56) References Cited

U.S. PATENT DOCUMENTS

| | | | |
|---|---|---|---|
| 7,830,852 | B2 | 11/2010 | Twitchell |
| 7,870,999 | B2 | 1/2011 | Skaaksrud et al. |
| 7,974,637 | B1 | 7/2011 | Taveniku |
| 8,126,675 | B2 | 2/2012 | Vock et al. |
| 8,280,345 | B2 | 10/2012 | Twitchell |
| 8,890,683 | B2 | 11/2014 | Schnitz et al. |
| 9,595,018 | B2 | 3/2017 | Carvajal |
| 2003/0149674 | A1 | 8/2003 | Good et al. |
| 2008/0291033 | A1 | 11/2008 | Aghassipour |
| 2009/0115609 | A1 | 5/2009 | Weaver |
| 2015/0012457 | A1 | 1/2015 | Gonzalez et al. |
| 2015/0177114 | A1 | 6/2015 | Kapoor et al. |
| 2015/0347960 | A1 | 12/2015 | Choi et al. |
| 2016/0328677 | A1 | 11/2016 | Ferrer et al. |
| 2016/0379163 | A1 | 12/2016 | Johanson et al. |
| 2018/0025603 | A1 | 1/2018 | Tyler et al. |
| 2018/0293539 | A1 | 10/2018 | Tubb |
| 2018/0324204 | A1* | 11/2018 | McClory ................. G06F 9/505 |
| 2018/0331905 | A1* | 11/2018 | Toledo ............... H04L 43/0882 |
| 2018/0365636 | A1 | 12/2018 | Lucrecio et al. |
| 2019/0095241 | A1* | 3/2019 | Ago ..................... G06F 16/2291 |
| 2020/0042365 | A1* | 2/2020 | Tanna ..................... G06F 9/465 |

FOREIGN PATENT DOCUMENTS

| | | |
|---|---|---|
| WO | 2009140669 A2 | 11/2009 |
| WO | 2017157718 A1 | 9/2017 |

OTHER PUBLICATIONS

Pham. "Resource Oriented Architecture in Wireless Sensor Network." Bachelor thesis, University of Applied Science of Western Switzerland (2008). 71 pages. http://citeseerx.ist.psu.edu/viewdoc/download?doi=10.1.1.419.4971&rep=rep1&type=pdf.

Jackson, et al. "Location tracking of test vehicles using accelerometers." Proceedings of the 5th WSEAS Int. Conf. on Circuits, Systems, Electronics, Control & Signal Processing, Dallas, USA. 2006. 4 pages. http://citese erx.ist.psu.edu/viewdoc/download?doi=10.1.1.545.1565&rep=rep1&type=pdf.

Jackson, et al. "A rationale for the use of optical mice chips for economic and accurate vehicle tracking." IEEE Conference on Automation Science and Engineering, Sep. 2007. 6 pages. https://www.computer.or g/csdl/proceedings/case/2007/1153/00/04341837.pdf.

Thomason, et al. "NextGen Asset Tracking (NAT) Device." (2017). 187 pages. http://www.eecs.ucf.edu/seniordesign/su2017fa2017/g01/EEL4914 _NAT_finalPaper_summer2017.pdf.

* cited by examiner

SMART CASCADING SECURITY FUNCTIONS FOR 6G OR OTHER NEXT GENERATION NETWORK

TECHNICAL FIELD

This disclosure relates generally to facilitating smart cascading. For example, this disclosure relates to facilitating smart cascading security functions for a 6G, or other next generation network.

BACKGROUND

Deep packet inspection (DPI) is a type of data processing that inspects in detail the data being sent over a computer network, and usually takes action by blocking, re-routing, or logging it accordingly. While deep packet inspection can be used for innocuous reasons such as making sure that data is in the correct format or checking for malicious code, it can also be used for censorship and security. Deep packet inspection (and filtering) can enable advanced network management, user services, and security functions as well as Internet data mining, eavesdropping, and Internet censorship.

The above-described background relating facilitating smart cascading security functions is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
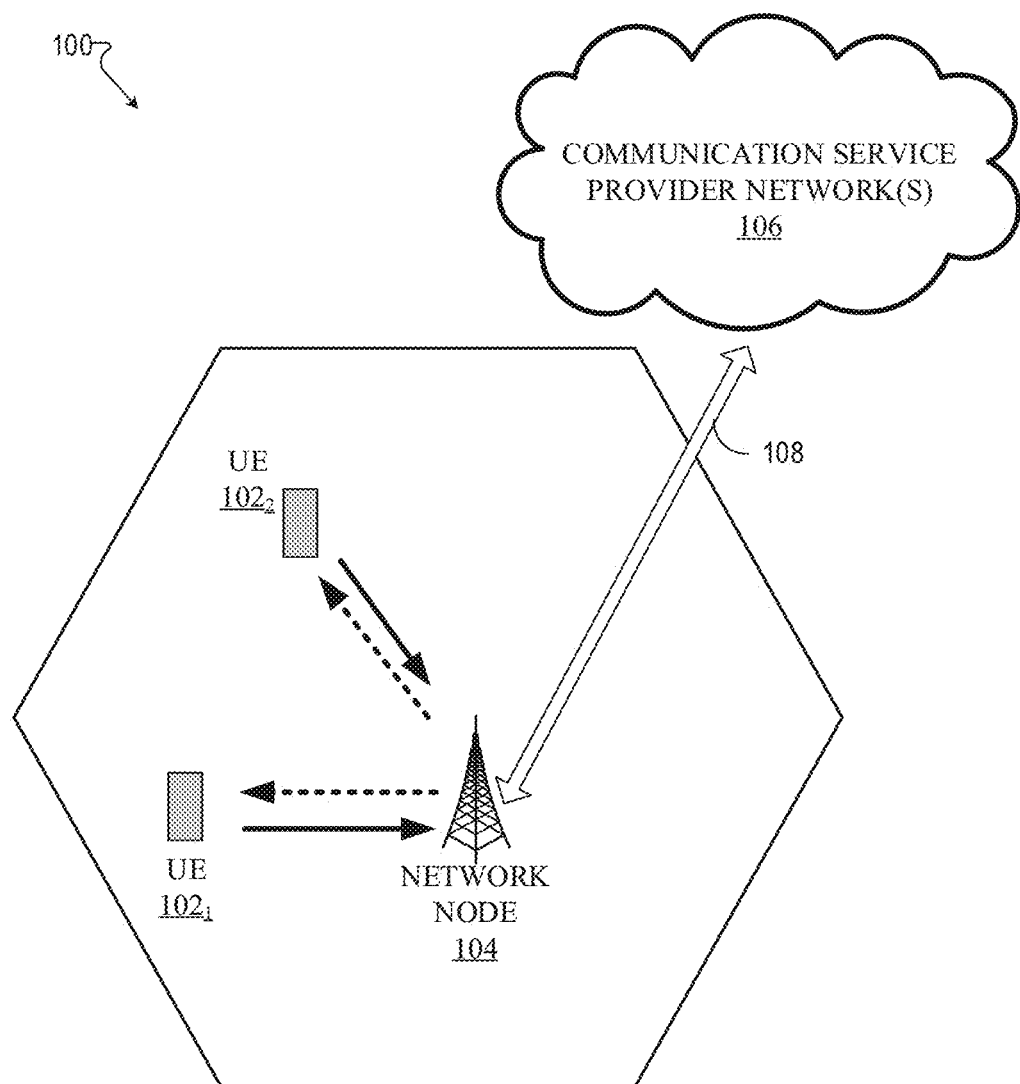
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate smart cascading security functions for a 6G interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 6G, the disclosed aspects are not limited to 6G, a UMTS implementation, and/or an LTE implementation as the techniques can also be applied in 3G, 4G, 5G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate smart cascading security functions for a 6G network. Facilitating smart cascading security functions for a 6G network can be implemented in connection with any type of device with a connection to the communications network (e.g., a mobile handset, a computer, a handheld device, etc.) any Internet of things (JOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service (QoS) and traffic management and routing can be synchronized and managed end to end.

An LTE network can be a policy-based traffic management architecture with a PCRF element traditionally controlling the QoS levels and other information (priorities bandwidths, etc.) that manages IP flows that carries a particular application (such as voice, video, messaging, etc.). This policy-based mechanism applies to the IP traffic between the mobile device and the packet data network gateway ("PGW"). In an embodiment of the subject disclosure, software defined networking can be used to provide routing and traffic control for packets sent from the PGW to a destination address. In some embodiments, the SDN controller can also provide traffic control for packets from the mobile device to the destination in some embodiments.

The PCRF and the SDN controller can also communicate about some aspects of a particular application flow so that routing decisions both in the access network (between eNodeB and PGW) as well as in the backbone can be made based on the nature of the application and how that particular flow was expected to be treated based on operator policies and user subscription. For example, if a higher QoS is to be applied to a traffic flow carrying voice packet, the service related information such as QoS can be used by SDN controller to make decisions such as mapping and route optimizations. This can enable the entire network to be application aware with a consistent treatment of the packets.

Radio access network abstraction can provide a separation between the physical radios and a logical view of the network. It can provide a holistic view of a pool of various radio resources from various radio technologies. This can allow a network controller to make an intelligent decision on what radio to use to deliver a service based on application requirements. The radio access network abstraction can also have a dynamic learning capability to constantly update the network view of the radio resources upon adding, changing, removing and/or modifying the resources.

Under this framework, various applications (e.g., smart city, connected cars) and/or various customers (e.g., General Motors, Amazon, etc.) can ask for different services or technologies. Based on their service needs (e.g. latency, speed, etc.), the intelligent control can pick and choose access, backhaul, and/or service delivery based on this framework.

As shown in the figures, an abstraction layer can separate the physical radios and logical view of the radio network. The figures provide a holistic view of various radio resources from various radio technologies. In addition, the radio network graph can also have a presentation on network slices and their corresponding characteristics. The logical view and access can allow an SDN controller to make intelligent decisions based on the conditions, radio technology, and what slice to use to deliver a service based on application requirements.

The network slice can be dedicated for a specific network function (e.g., extended reality (XR), augmented reality (AR), and/or virtual reality (VR) to manage and allocate network resources. For example, currently when an application session begins, the session can either instantiate the slice or tap into a slice that is already there. Consequently, once a consumer begins consuming a service, the slice is already active for that service. Thus, the XR can have its own specific slice.

A 6G network has the ability to dedicate an edge slice with the capability to intelligently perform edge computing of a large number of information on demand. In a 6G network, microservice enabled solutions can bypasses the core network. Additionally, after an initial provisioning the network can autonomously communicate with connected parties. This solution can utilize a dynamic handling request for packet propagation. Dynamic means that the handling request can change depending on the distance the packet has to travel, time associated with travel, time of day, time of year, etc.

For example, if a packet is set to travel via the network and interact with several nodes, the sending node can create a profile for the packet and attach a packet profile to the packet according to packet characteristics. The packet profile can comprise initial packet profile characteristics and be distributed within a 6G edge slice tailored for a specific service associated with the packet. Once the packet is ready to be sent, the packet profile can be sent, with and/or in advance of the packet itself, to downstream nodes. Consequently, each node can be informed and updated with every reading of the packet and the possibility of a false positive with regards to the packet characteristics can be mitigated or eliminated.

In a 6G network, microservices can be utilized as an alternative to the core network. For example, after a device is on-boarded (e.g., path set-up, authentication, level of service, etc.) to the network, the microservices can facilitate internetwork communication. Thus, microservices can perform certain functions without the core network (e.g., changing prices, latency mitigation, etc.).

An IP packet can be sent dynamically (e.g., short or long route) depending on distance, size, network bandwidth, etc. However, the packet can be directed via a cascading solution. Thus, the packet can be sent through the network via several hops to routers. For example, every network node can communicate with each other to facilitate the fastest route for the packet. However, another route can utilize network nodes that can handle a certain size packet. Consequently, if info regarding the packet changes at one network node, then the information can change at all of the network nodes based on that information being propagated from one-to-many nodes. For example, if a network node's processing power is reduced, then this information can be sent to other network nodes so that the other network nodes can know not to send additional packets and/or packets that can require more processing power than the network node can accommodate. Additionally, a profile can be associated with packets of the network. For example, the profile can comprise data regarding quality of service, characteristics of the packet, and/or cyclic redundancy check (CRC). Thus, the packet profile can be distributed amongst the nodes in efforts to route the packet according to its characteristics.

Additionally, the packet profile can indicate that the packet is a faulty packet or is subject to packet loss within the wireless network. Although a transmission control protocol (TCP) can be used with this disclosure to detect and account for packet loss by performing retransmissions, the goal of this disclosure is to ensure reliable packet transmissions by transmitting characteristics of the packets via the packet profile. This information can be sent downstream in a 6G network and allow a network slice to communicate between the sensory device and the packet profile. This process can be used to simultaneously alert a specific node, a subset of nodes, or all nodes in the network, of packet incidents and/or delays. Thus, this system can provide the ability to dynamically track any aspect of a packet via simultaneous tracking of a number of parameters associate with the packet and participating nodes. This system can also enable a secure reporting capability between all nodes, simultaneously. Additionally, the aforementioned processes can secure the records from any tampering since the same record (e.g., packet profile) is received by all the nodes, and thus any changes to the packet profile data can be rejected by all other nodes unless the packet profile data is an exact duplicate.

In one embodiment, described herein is a method comprising facilitating, by a network device comprising a processor, establishing a wireless connection between a core network device and a mobile device of a wireless network to facilitate a service to be provided to the mobile device. In response to the establishing the wireless connection, the method can comprise removing, by the network device, a connection between the core network device and the mobile device. Additionally, the method can comprise accessing, by the network device, a function library associated with a service layer to provide the service to the mobile device. Furthermore, in response to the accessing the function library, the method can comprise facilitating, by the network device, providing the service to the mobile device.

According to another embodiment, a system can facilitate coupling a wireless network service layer, of a wireless network, to a microservice function library. Based on a wireless connection between a core network device and a mobile device of the wireless network, the system can comprise selecting a microservice, from the microservice function library, to be allocated to the mobile device. In response to the selecting the microservice, the system can comprise allocating the microservice to the mobile device. Furthermore, in response to the coupling the wireless network service layer and after the selecting the microservice, the system can comprise terminating the wireless connection between the core network device and the mobile device.

According to yet another embodiment, described herein is a machine-readable storage medium that can perform the operations comprising coupling a wireless network service layer, of a wireless network, to a microservice function library. Based on a wireless connection between a core network device and a mobile device of the wireless network, the machine-readable storage medium can perform the operations comprising selecting a microservice, from the microservice function library, to be allocated to the mobile device. In response to the selecting the microservice, the machine-readable storage medium can perform the operations comprising determining a route for a packet of the wireless network to traverse. Additionally, in response to the coupling the wireless network service layer and after the selecting of the microservice, the machine-readable storage medium can perform the operations comprising terminating the wireless connection between the core network device and the mobile device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly. It should be noted that the UE 102 can be a mobile device 102.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 6G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Figure 2:
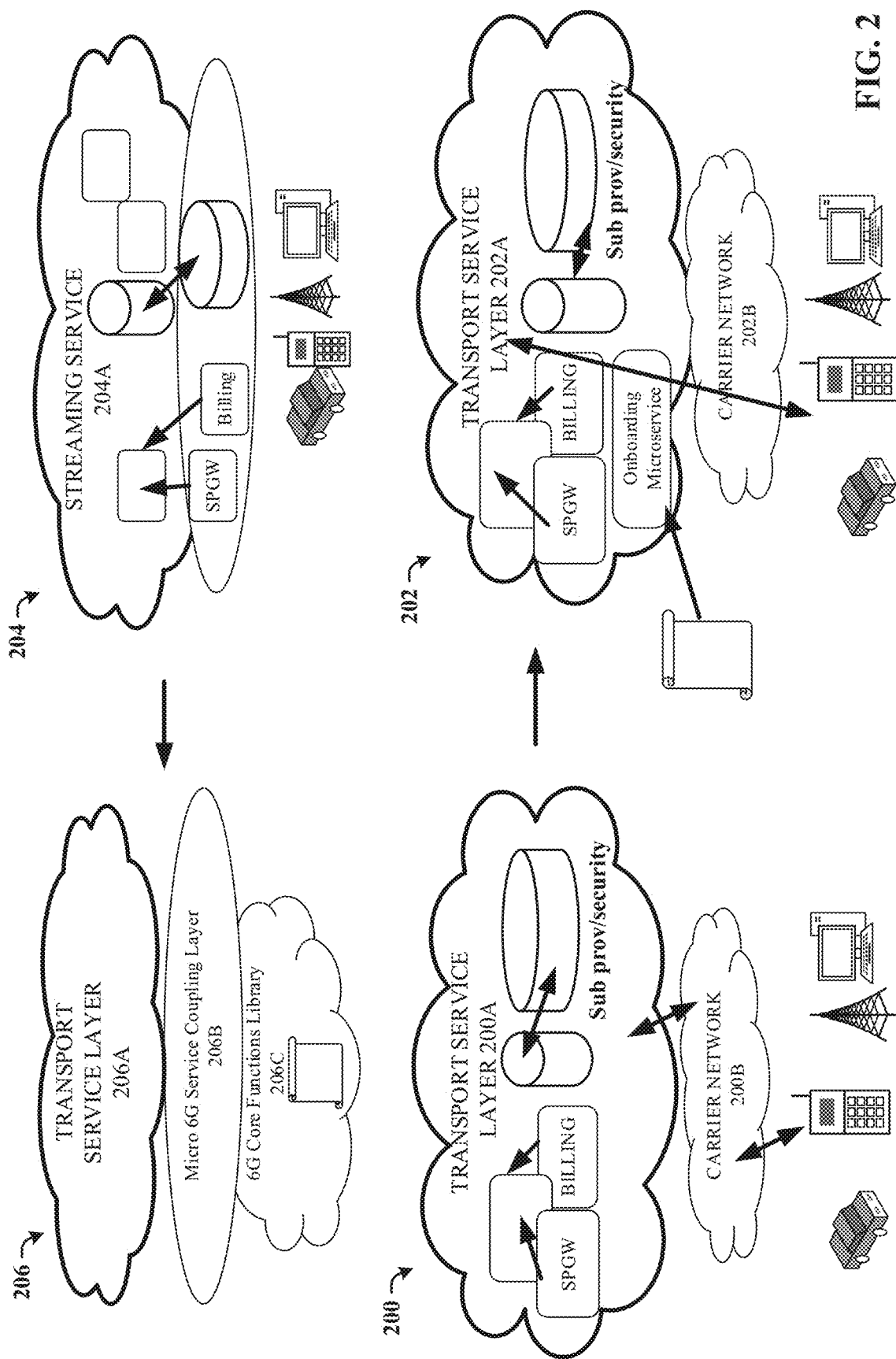
FIG. 2 illustrates an example schematic system block diagram facilitating onboarding of microservices according to one or more embodiments.

Referring now to FIG. 2, illustrated is an example schematic system block diagram facilitating onboarding of microservices according to one or more embodiments. The bottom left of FIG. 2 depicts a full-fledged carrier network (e.g., system 200), whereby data comes from the transport service layer 200A down through the carrier network 200B to the mobile devices 102. However, the bottom right of FIG. 2 depicts (e.g., system 202) an onboarding service in the transport service layer 202A, whereby the microservices are on-boarded with the packet profile data via the transport service layer 202A to facilitate direct communication of the microservices to the mobile devices 102 without utilizing the carrier network 202B. This can occur once the mobile device 102 is already authenticated/onboarded with the service provider through the carrier network 202B. The top right (e.g., system 204) of FIG. 2 depicts the removal of the carrier network. Thus, after onboarding and/or instantiation, the microservices (e.g., streaming service 204A) can be provided directly to the user equipment 102, via system 204 without using a carrier network (e.g., 200B, 202B). The upper left portion of FIG. 2 (e.g., system 206) depicts a transport service layer 206A comprising a microservice coupling layer 206B (e.g., what types of services are used, what types of functionality is available (e.g., security, customer experience, billing, change of service level agreement, etc.)), which can provide for the coupling of the 6G core functionality for the microservices to be provided directly to the user equipment. Additionally, at system 206, microservice functions can be selected by the system 204 from a function library and substantiated in a microservices environment without the carrier network (e.g., 200B, 202B).

Figure 3:
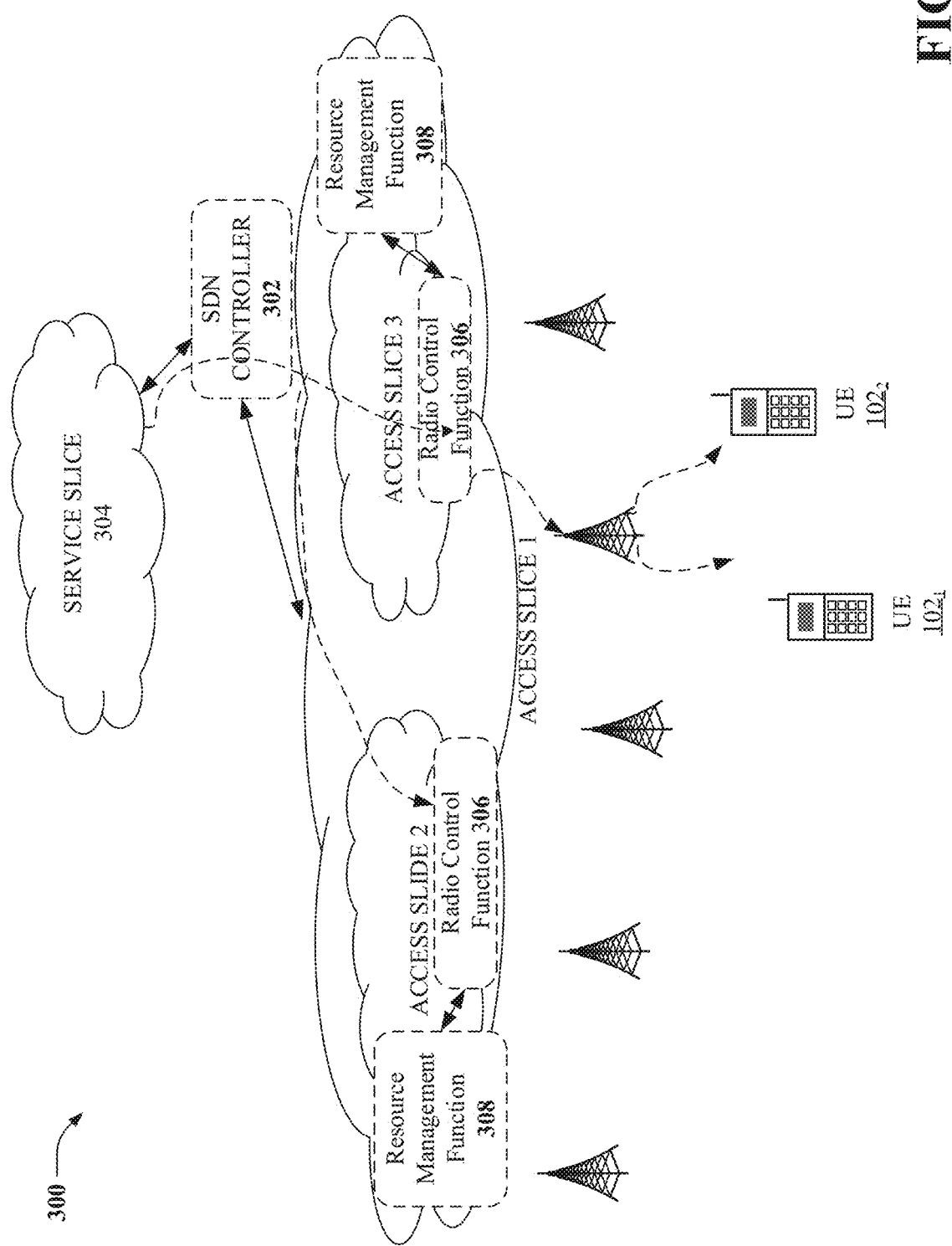
FIG. 3 illustrates an example schematic system block diagram of network slicing according to one or more embodiments.

Referring now to FIG. 3, illustrated is an example schematic system block diagram 300 of network slicing according to one or more embodiments. An abstraction layer can separate the physical radios and logical view of the radio network. Thus, various radio resources from various radio technologies can be utilized. The logical view and access can allow an SDN controller to make intelligent decisions based on the conditions, radio technology, and what slice to use to deliver a service based on application requirements. Additional access technology/resources, such as macro access technology (e.g., eNode B) and micro access technologies (e.g., Wi-Fi, wireless local area network (WLAN), low-power wide area network (LPWAN), long range (LoRa), radio access network (RAN)s, Bluetooth peer-to-peer network, metro cell, etc.), can be added to address access uniformity issues.

Network slices 304 can be created to address specific needs of service calls, or transport, or access capability. Thus, the access network can be divided by slices to separately address multiple needs. The slice of an access layer can be vertical or horizontal and can manage a defined number of radios with various frequencies and various capabilities. For example, an access slice can comprise a resource management function 308, a radio control function 306, and other capabilities to aid a specific function. The resource management function 308 can determine, for the radio controller function 306, how many resources it needs, which can depend on what type of service it is using. The service can communicate to the access layer what kind of bandwidth it is looking for, which can be controlled by the SDN controller 302.

6G network slicing capabilities can enable edge computing for microservices to be provided directly to an end user. By utilizing a dedicated slice, existing network resources and other available resources can be enabled to service UEs 102. The network slice can also be dedicated for a specific network function (e.g., extended reality, augmented reality, and/or virtual reality) to manage and allocate network resources.

The resource management function 308, on a slice, can access information on the resources of a particular slice and decide where it has additional and/or unused resources (e.g., Wi-Fi, LPWAN, access capability) that it can add to the service application for 6G microservices. Alternatively, the resource management function 308 can remove capacity from other service applications that are of a lessor priority and/or that do not need as much capacity. Consequently, the resource management function 308 can distribute and/or allocate a specific resource and/or percentage of resources based on policies (e.g., policies associated with eNode B devices, service level agreements, priorities, network loads, etc.).

Figure 4:
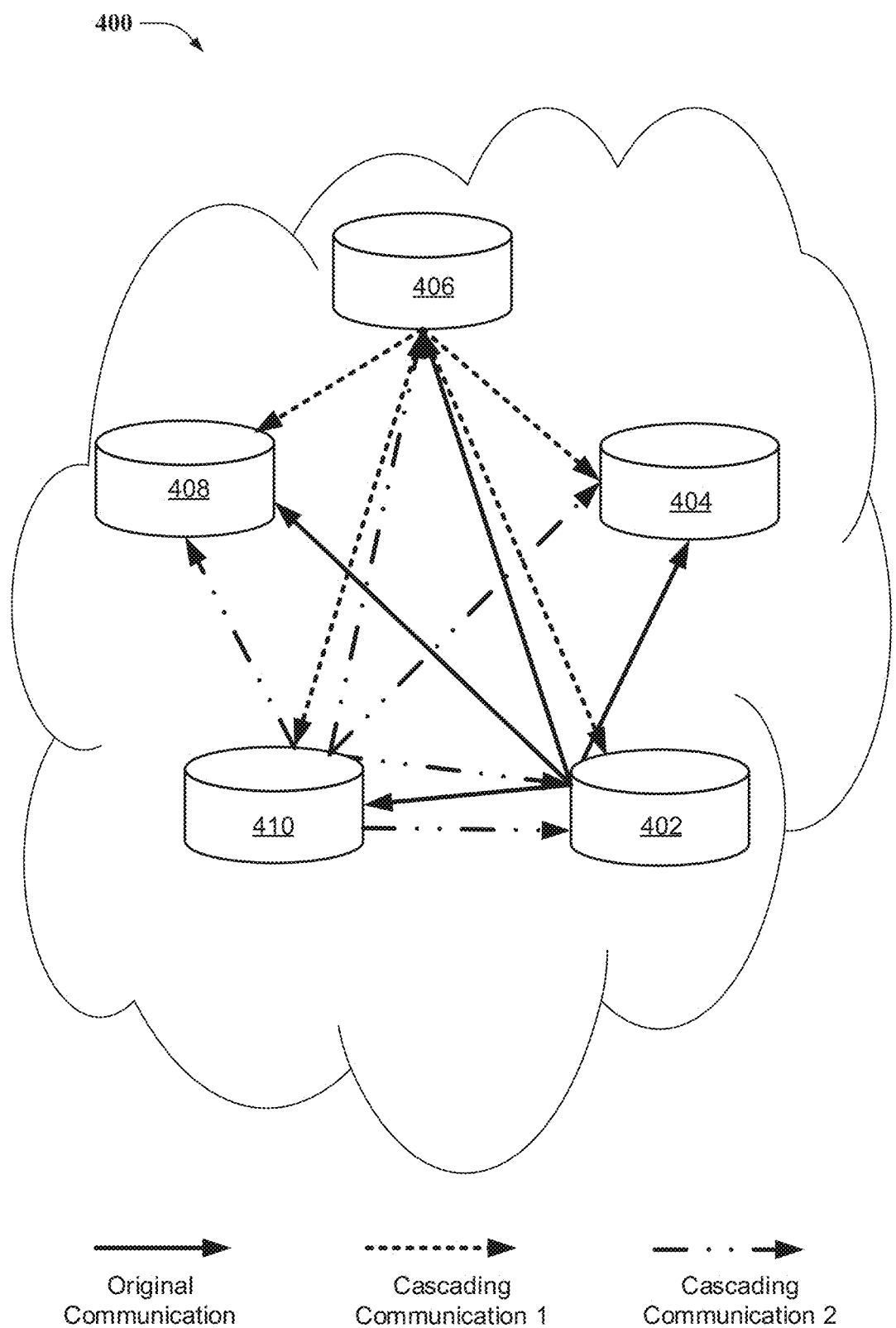
FIG. 4 illustrates an example system smart cascading security function according to one or more embodiments.

Referring now to FIG. 4, illustrated is an example system 400 smart cascading security function according to one or more embodiments. Microservice enabled solutions can bypass the core network, and after initial provisioning can autonomously communicate with involved parties. For example, a handling request for a dynamic packet can change the distance the packet travels. All nodes 402, 404, 406, 408, 410 in the network can communicate with each other and can agree on the packet of data. For example, in going from nodes 402 to 404 to 406 to 408 to 410, nodes 402, 404, 406, and 408 can know that the packet has a final destination of node 410. In a dynamic scenario, the nodes 402 to 404 to 406 to 408 to 410 can communicate to each other that nodes 402 to 406 to 408 can be the fastest route for the packet to traverse the network, but nodes 404 and 406 can handle larger packets, then this can be taken into consideration as well.

Consequently, by communicating with each other, the nodes 402 to 404 to 406 to 408 to 410 can determine the most efficient route for the packet based on the packet profile. Characteristics of the packet profile can comprise the packet importance, its QoS, its cyclic redundancy check, etc., and be considered in addition to the network conditions. If the packet is large, then a node (for example 404) capable of handling a large packet can reduce its processing power with regards to other packets. Thus, the reduced processing power of the node 404 can be cascaded to the other nodes 402, 406, 408, 410, such that the other nodes 402, 406, 408, 410 know that that node 404 is now incapable of handling other large packets. Consequently, the route for another large packet can be adjusted dynamically based on a previous, current, and/or future workload of another node.

Figure 5:
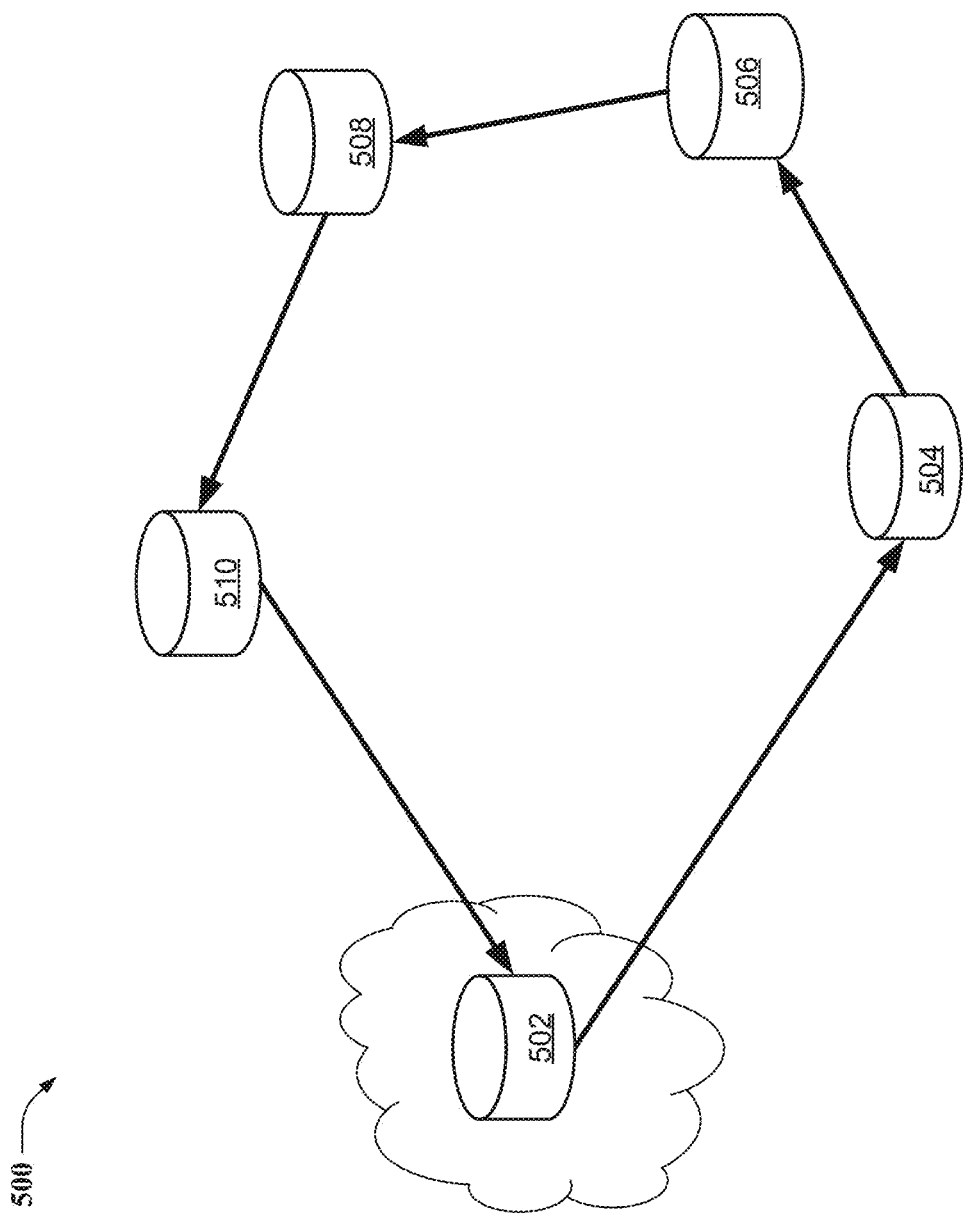
FIG. 5 illustrates an example system smart cascading security function according to one or more embodiments.

Referring now to FIG. 5, illustrated is an example system 500 smart cascading security function according to one or more embodiments. In addition to the nodes of a wireless carrier as depicted in FIG. 4, FIG. 5 depicts a scenario whereby for a given pathway for packet transmission can be linear. Packet profile data associated with a packet to be sent from node 502 can be sent to nodes 504, 506, 508, 510 and back to node 502 accordingly. For example, upon receiving the packet profile data, each of the nodes 504, 506, 508, 510 can append its status to the data. The node statuses can comprise various characteristics (e.g., bandwidth capability, processing capacity, size, delay time, distance to nearest node, etc.) of each node. Consequently, if each node 504, 506, 508, 510 is available and the packet data falls within the parameters of the nodes 504, 506, 508, 510 availability to facilitate the packet transmission, then the packet can traverse the network accordingly. The node 510 can then send an indication of the potential pathway to the node 502 prior to the node 502 sending the packet out to the node 504.

Figure 6:
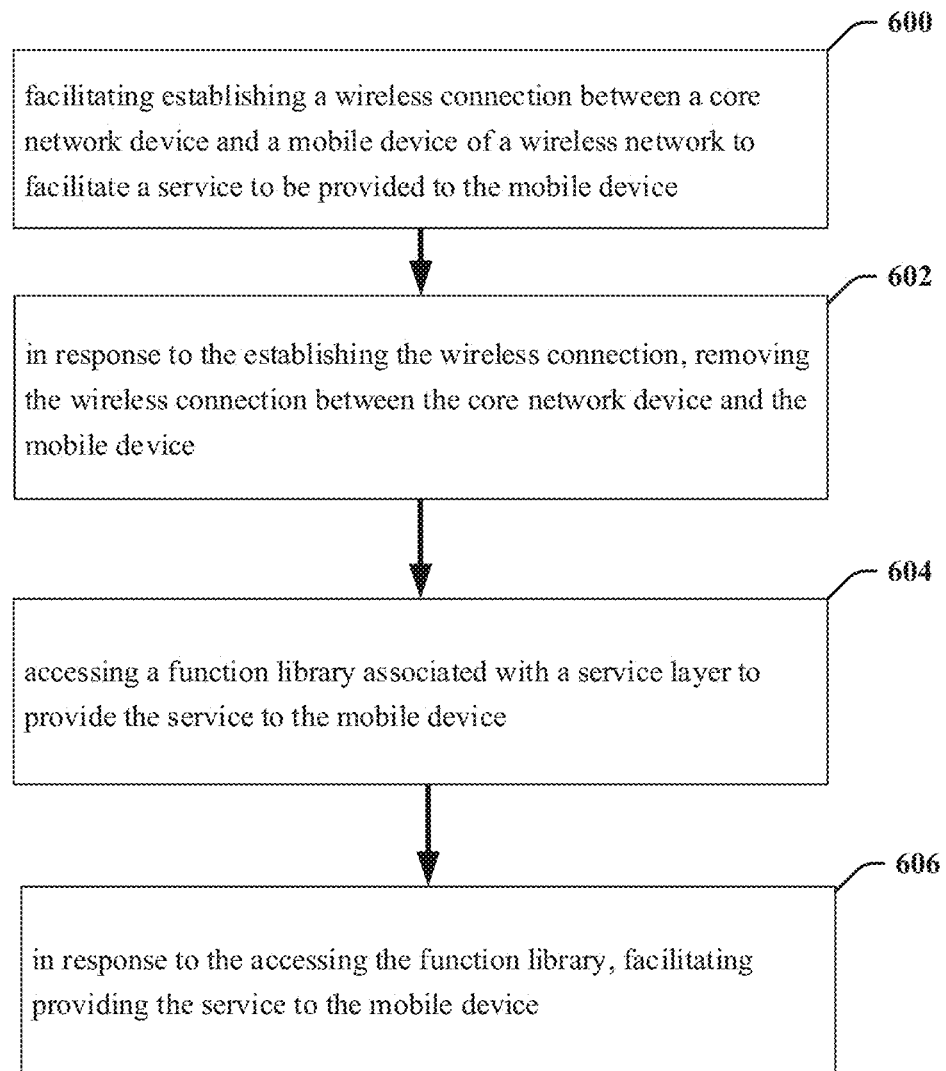
FIG. 6 illustrates an example flow diagram of a method for facilitating a smart cascading security function according to one or more embodiments.

Referring now to FIG. 6, illustrated is an example flow diagram of a method for facilitating a smart cascading security function according to one or more embodiments. At element 600, the method comprising facilitating establishing a wireless connection between a core network device (e.g., of carrier network 200B) and a mobile device 102 of a wireless network to facilitate a service (e.g., streaming service 204A) to be provided to the mobile device 102. In response to the establishing the wireless connection, the method can comprise removing the wireless connection between the core network device (e.g., of carrier network 200B) and the mobile device 102 at element 602. Additionally, the method can comprise accessing a function library associated with a service layer to provide the service to the mobile device at element 606. Furthermore, at element 606, in response to the accessing the function library 206C, the method can comprise facilitating providing the service (e.g., streaming service 204A) to the mobile device 102.

Figure 7:
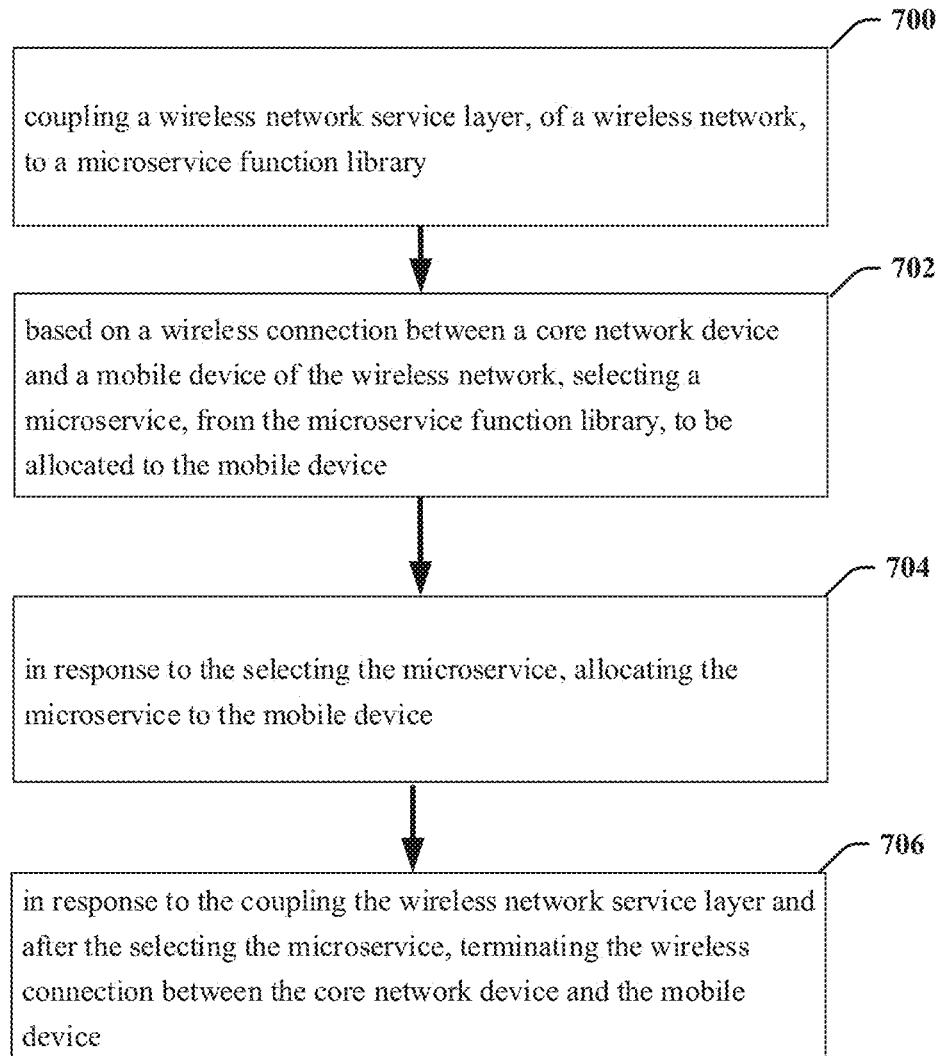
FIG. 7 illustrates an example flow diagram of a system for facilitating a smart cascading security function according to one or more embodiments.

Referring now to FIG. 7, illustrated is an example flow diagram of a system for facilitating a smart cascading security function according to one or more embodiments. At element 700, a system can facilitate coupling a wireless network service layer (e.g., transport service layer 202A), of a wireless network, to a microservice function library 206C. Based on a wireless connection between a core network device and a mobile device 102 of the wireless network, the system can comprise selecting a microservice (e.g., streaming service 204A), from the microservice function library 206C, to be allocated to the mobile device 102 at element 702. In response to the selecting the microservice (e.g., streaming service 204A), at element 704 the system can comprise allocating the microservice (e.g., streaming service 204A) to the mobile device 102. Furthermore, in response to the coupling the wireless network service layer (e.g., transport service layer 202A) and after the selecting the microservice (e.g., streaming service 204A), the system can comprise terminating the wireless connection between the core network (of the carrier network 202B) device and the mobile device 102 at element 706.

Figure 8:
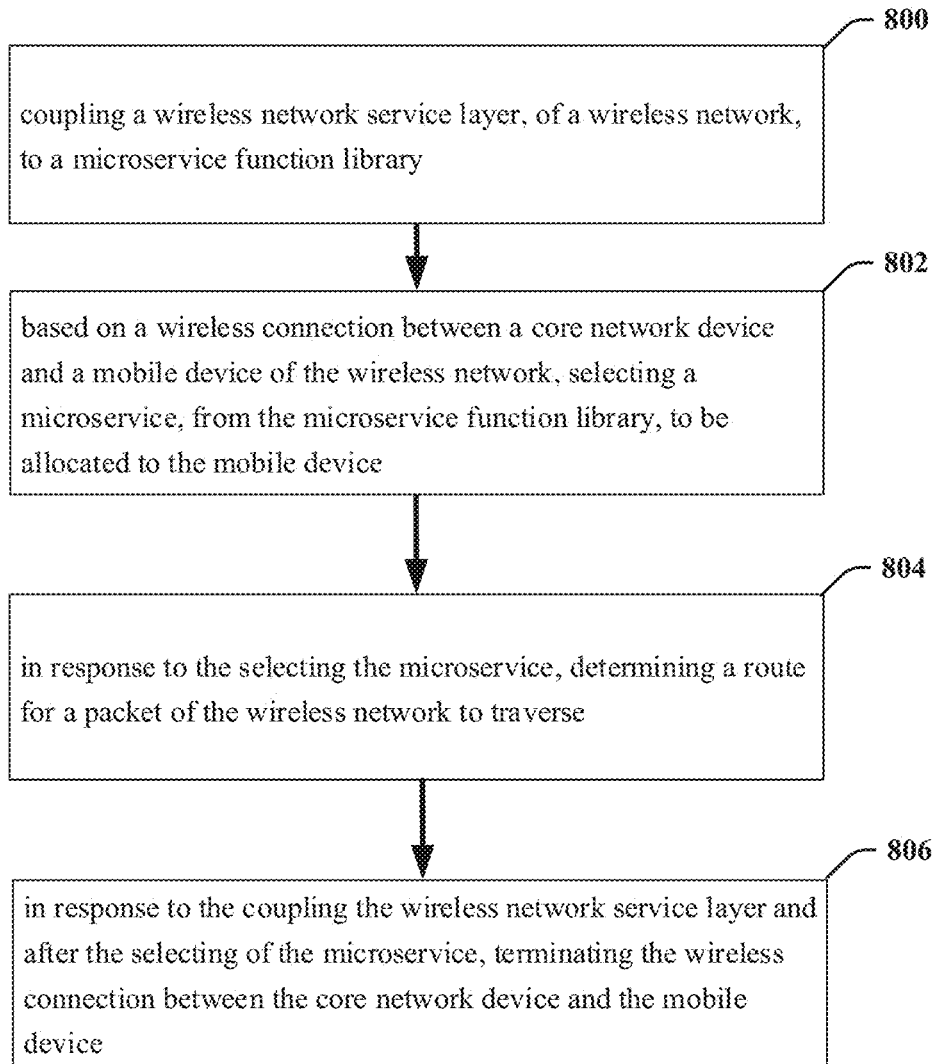
FIG. 8 illustrates an example flow diagram of a machine-readable medium for facilitating a smart cascading security function according to one or more embodiments.

Referring now to FIG. 8, illustrated is an example flow diagram of a machine-readable medium for facilitating a smart cascading security function according to one or more embodiments. At element 800, the machine-readable storage medium can perform the operations comprising coupling a wireless network service layer (e.g., transport layer 202A), of a wireless network, to a microservice function library 206C. Based on a wireless connection between a core network device and a mobile device 102 of the wireless network, at element 802, the machine-readable storage medium can perform the operations comprising selecting a microservice (e.g., streaming service 204A), from the microservice function library 206C, to be allocated to the mobile device 102. In response to the selecting the microservice, at element 804, the machine-readable storage medium can perform the operations comprising determining a route for a packet of the wireless network to traverse. Additionally, at element 806, in response to the coupling the wireless network service layer (e.g., the transport service layer 202A) and after the selecting of the microservice (e.g., the streaming service 204A), the machine-readable storage medium can perform the operations comprising terminating the wireless connection between the core network device and the mobile device 102.

Figure 9:
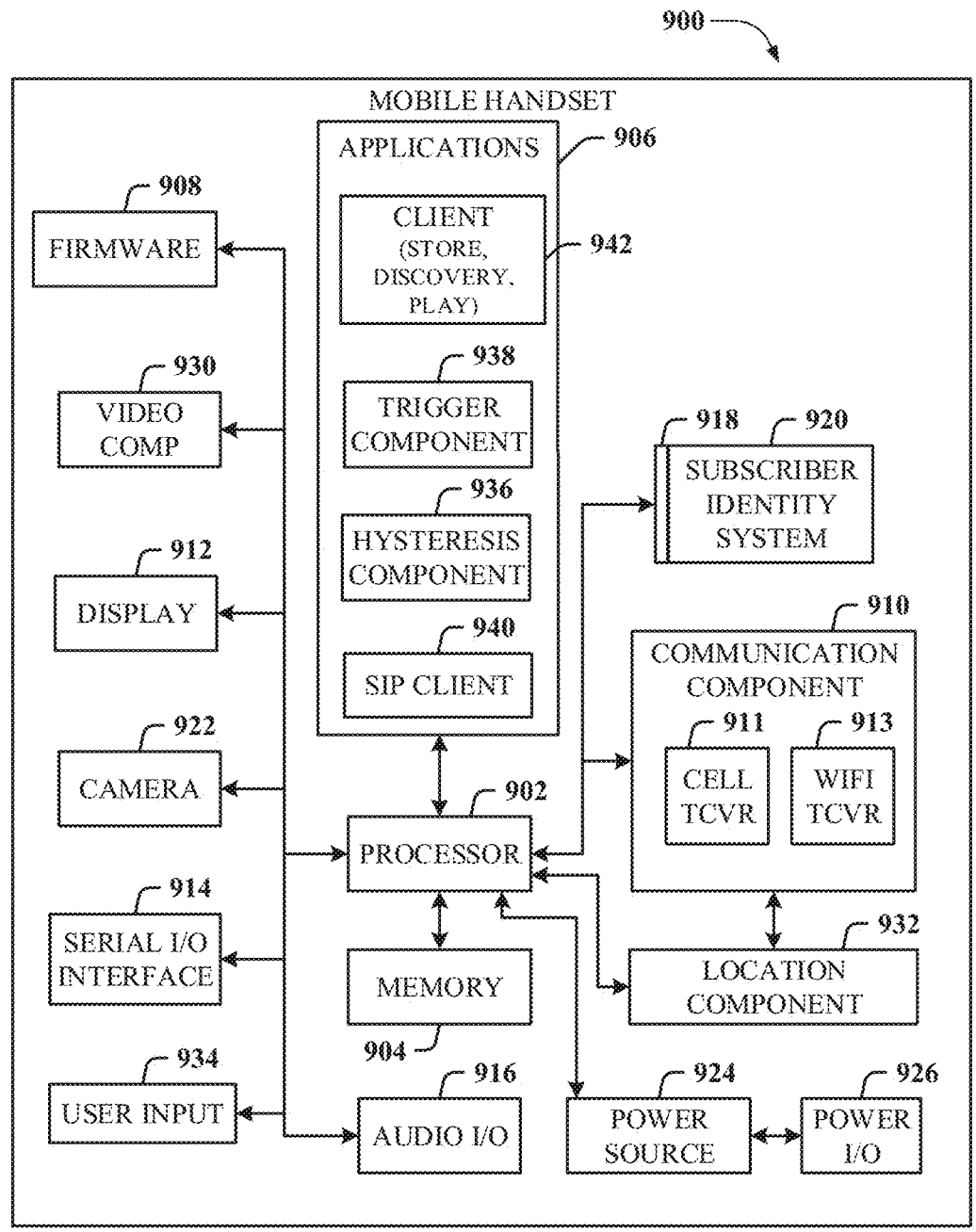
FIG. 9 illustrates an example block diagram of an example mobile handset operable to engage in a system architecture that facilitates secure wireless communication according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that this disclosure also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
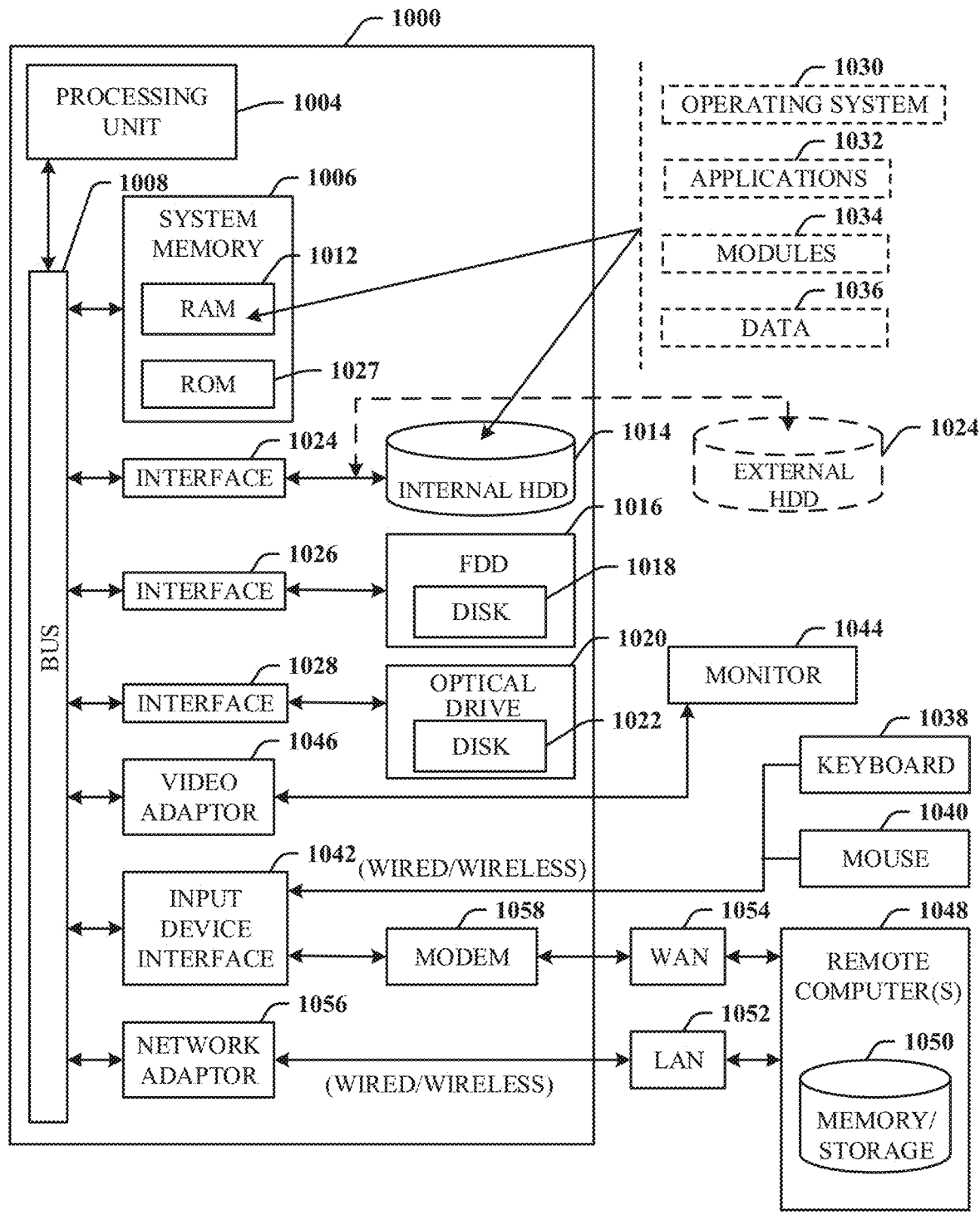
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of this disclosure can be implemented to facilitate the establishment of a transaction between an entity and a third party. While the description above is in the general context of computer-executable instructions that can run on one or more computers, those skilled in the art will recognize that this disclosure also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of this disclosure can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosure.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that this disclosure can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   establishing, by network equipment comprising a processor, a connection between core network equipment and a user equipment to facilitate a network service to be provided to the user equipment;
   in response to establishing the connection, removing, by the network equipment, the connection between the core network equipment and the user equipment;
   accessing, by the network equipment, a function library associated with a service layer to provide the network service to the user equipment;
   in response to accessing the function library, providing, by the network equipment, the network service to the user equipment;
   receiving, by the network equipment, an indication of a reduced processing power associated with operation of a network node from a first processing power to a second processing power less than the first processing power;
   in response to receiving the indication, modifying, by the network equipment, a packet profile of a packet associated with the network service; and
   in response to modifying the packet profile, rerouting, by the network equipment, the packet to avoid the network node,
   wherein the network service is a microservice accessible via the function library.

2. The method of claim 1, further comprising:
   coupling, by the network equipment, the service layer to the function library to perform the facilitating of the providing of the network service.

3. The method of claim 2, further comprising:
   generating, by the network equipment, packet identification data representative of a status of the packet.

4. The method of claim 3, wherein the microservice is a streaming service provided by the service layer based on the establishing the connection between the core network equipment and the user equipment.

5. The method of claim 1, wherein facilitating the establishing of the connection between the core network equipment and the user equipment comprises performing a security assessment to determine whether the user equipment has access to the network service.

6. The method of claim 1, wherein facilitating the establishing of the connection between the core network equipment and the user equipment comprises initiating a billing function to determine whether the user equipment has access to the network service.

7. The method of claim 1, wherein facilitating the establishing of the connection between the core network equipment and the user equipment comprises instantiating a network slice.

8. A system, comprising:
   a processor; and
   a memory that stores executable instructions that, when executed by the processor, facilitate performance of operations, comprising:
   coupling a network service layer to a microservice function library via a network;
   based on a connection between core network equipment and a user equipment via the network, selecting a micro service, from the microservice function library, to be allocated to the user equipment;
   in response to selecting the microservice, allocating the microservice to the user equipment;
   in response to coupling the network service layer and after selecting the microservice, terminating the connection between the core network equipment and the user equipment;
   receiving an indication of a reduced processing power associated with network node equipment from a first processing power to a second processing power less than the first processing power;
   based on the indication, modifying a packet profile of a packet associated with the microservice; and
   in response to modifying the packet profile, rerouting the packet to avoid the network node equipment.

9. The system of claim 8, wherein the operations further comprise:
   generating packet identification data representative of a status of the packet.

10. The system of claim 9, wherein the packet identification data comprises a quality of service associated with delivery of the packet.

11. The system of claim 9, wherein the operations further comprise:

based on selecting the microservice, determining a route for the packet to traverse.

12. The system of claim 11, wherein determining the route for the packet to traverse is based on determining the route for the packet to traverse in a least amount of time.

13. The system of claim 11, wherein determining the route for the packet to traverse is based on determining a processing capacity associated with the network node equipment.

14. The system of claim 13, wherein the network node equipment is first network node equipment and wherein the operations further comprise:
cascading the reduced processing power of the first network node equipment to second network node equipment to reduce the processing power of the second network node equipment.

15. A non-transitory machine-readable medium, comprising executable instructions that, when executed by a processor, facilitate performance of operations, comprising:
coupling a network service layer to a microservice function library via a network;
based on a connection between a core network equipment and a user equipment via the network, selecting a microservice, from the microservice function library, to be allocated to the user equipment;
in response to selecting the microservice, determining a route for a packet of the network to traverse;
in response to coupling the network service layer and after selecting the microservice, terminating the connection between the core network equipment and the user equipment;
receiving an indication of a reduced processing power of a network node;
based on the indication, altering a packet profile of the packet associated with the microservice; and
in response to altering the packet profile, rerouting the packet to avoid the network node.

16. The non-transitory machine-readable medium of claim 15, wherein the operations further comprise:
modifying the route for the packet to reduce a latency associated with the microservice.

17. The non-transitory machine-readable medium of claim 16, wherein the modifying the route comprises removing at least one of a group of a network nodes from the route for the packet to traverse.

18. The non-transitory machine-readable medium of claim 15, wherein the operations further comprise:
using the connection between the core network equipment and the user equipment, instantiating a security protocol to verify that the user equipment is permitted to access the microservice.

19. The non-transitory machine-readable medium of claim 15, wherein the microservice is a billing microservice that facilitates a billing function associated with the user equipment.

20. The non-transitory machine-readable medium of claim 15, wherein the operations further comprise:
generating profile data, representative of characteristics of the packet, to be sent to network nodes via of the network.

* * * * *